(12) United States Patent
Kim et al.

(10) Patent No.: US 8,472,117 B2
(45) Date of Patent: Jun. 25, 2013

(54) LENS ARRAY AND 3-DIMENSIONAL DISPLAY APPARATUS INCLUDING THE SAME

(75) Inventors: Hwi Kim, Seoul (KR); Kyung-Ho Jung, Yongin-si (KR); Hae-Young Yun, Suwon-si (KR); Jiangang Lu, Suwon-si (KR); Seung-Hoon Lee, Hwaseong-si (KR); Jung-hwan Yi, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 406 days.

(21) Appl. No.: 12/820,815

(22) Filed: Jun. 22, 2010

(65) Prior Publication Data

US 2011/0038044 A1 Feb. 17, 2011

(30) Foreign Application Priority Data

Aug. 13, 2009 (KR) ........................ 10-2009-0074888

(51) Int. Cl.
*G02B 27/10* (2006.01)
*G02B 1/06* (2006.01)

(52) U.S. Cl.
USPC ........................................... 359/619; 359/665

(58) Field of Classification Search
USPC ................. 359/619, 665–666, 676, 677, 683, 359/824; 417/413.2; 29/25, 35; 310/311, 310/317, 318; 360/294.4
See application file for complete search history.

(56) References Cited

U.S. PATENT DOCUMENTS

| | | | | |
|---|---|---|---|---|
| 5,774,273 A | * | 6/1998 | Bornhorst | 359/665 |
| 2006/0262433 A1 | * | 11/2006 | Hendriks et al. | 359/846 |
| 2007/0188882 A1 | * | 8/2007 | Cernasov | 359/659 |

* cited by examiner

*Primary Examiner* — Dawayne A Pinkney
(74) *Attorney, Agent, or Firm* — H.C. Park & Associates, PLC (57) ABSTRACT

A lens array according to an exemplary embodiment of the present invention includes: a first upper lattice plate including a plurality of first upper lattices; a first lower lattice plate including a plurality of first lower lattices; a first membrane disposed between the first upper lattice plate and the first lower lattice plate; a transparent liquid filled in the first lower lattice plate; and a hydraulic pressure controller positioned in the first lower lattice plate, wherein the first upper lattice and the first lower lattice are engaged with each other, thereby forming a plurality of first regions.

27 Claims, 10 Drawing Sheets

LENS ARRAY AND 3-DIMENSIONAL DISPLAY APPARATUS INCLUDING THE SAME

CROSS REFERENCE TO RELATED APPLICATION

This application claims priority from and the benefit of Korean Patent Application No. 10-2009-0074888 filed on Aug. 13, 2009, which is hereby incorporated by reference for all purposes as if fully set forth herein.

BACKGROUND OF THE INVENTION

1. Field of the Invention

Exemplary embodiments of the present invention relate to a lens array for a three-dimensional display, and a display device including the same.

2. Discussion of the Background

Typically, a three dimensional (3D) image is expressed based on the principle of stereo vision of two eyes. Binocular disparity (i.e., a disparity of two eyes that is caused because is they are apart by a distance of about 65 mm) plays an important role in a stereoscopic effect. That is, when left and right eyes view different 2D images and the two images are transmitted to the brain through retinas, the brain combines the two images to reconstruct reality such as depth in the original 3D image. Such ability is known as stereography.

Schemes using binocular disparity in 3D image displays are typically categorized, depending on a necessity for special spectacles, as stereoscopic schemes such as a polarization scheme and a time divisional scheme, and autostereoscopic schemes such as a parallax barrier scheme, a lenticular scheme, and a blinking light.

According to the stereoscopic schemes, a mass of people may simultaneously view 3D images if polarization spectacles or liquid crystal shutter spectacles are worn. However, due to the drawback that the polarization spectacles or liquid crystal shutter spectacles must be worn, the stereoscopic schemes are not typically used outside of movie theatres.

In contrast, according to the autostereoscopic schemes, special spectacles need not be worn to view the 3D image such that various methods have developed.

In an autostereoscopic image display device, a 3D image forming device may be aligned on an image panel to display a 3D image. However, the autostereoscopic image display device is realized as a singlet shape.

The information disclosed in this Background section is to enhance understanding of the background of the invention only, and it may contain information not within the prior art.

SUMMARY OF THE INVENTION

Exemplary embodiments of the present invention provide a lens array that is capable of converting two-dimensional images and three-dimensional images and having a is continuous shape.

Additional features of the invention will be set forth in the description which follows, and in part will be apparent from the description, or may be learned by practice of the invention.

An exemplary embodiment of the present invention discloses a lens array, including a first upper lattice plate comprising a plurality of first upper lattices, a first lower lattice plate comprising a plurality of first lower lattices, a first membrane disposed between the first upper lattice plate and the first lower lattice plate, a transparent liquid disposed within the first lower lattice plate, and a hydraulic pressure controller disposed in the first lower lattice plate, wherein the plurality of first upper lattices and the plurality of first lower lattices are engaged with each other thereby forming a plurality of first regions.

An exemplary embodiment of the present invention also discloses a lens array including a first membrane, a second membrane partially joined with the first membrane, a transparent liquid disposed between the first membrane and the second membrane, and a hydraulic pressure controller to control pressure of the transparent liquid.

An exemplary embodiment of the present invention also discloses a display device including a display panel comprising pixels to display images, and a lens array disposed on the display panel, wherein the lens array includes a first upper lattice plate comprising a plurality of first upper lattices, a first lower lattice plate comprising a plurality of first lower lattices, a first membrane disposed between the first upper lattice plate and the first lower lattice plate, a transparent liquid disposed within the first lower lattice plate, and a hydraulic pressure controller disposed in the first lower lattice plate, wherein the plurality of first upper lattices and the plurality of first lower lattices are engaged with each other, thereby forming a plurality of is first regions.

An exemplary embodiment of the present invention also discloses a display device including a display panel comprising pixels to display images, and a lens array disposed on the display panel, wherein the lens array includes a first membrane, a second membrane jointed with the first membrane, a transparent liquid disposed between the first membrane and the second membrane, and a hydraulic pressure controller to control pressure of the transparent liquid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
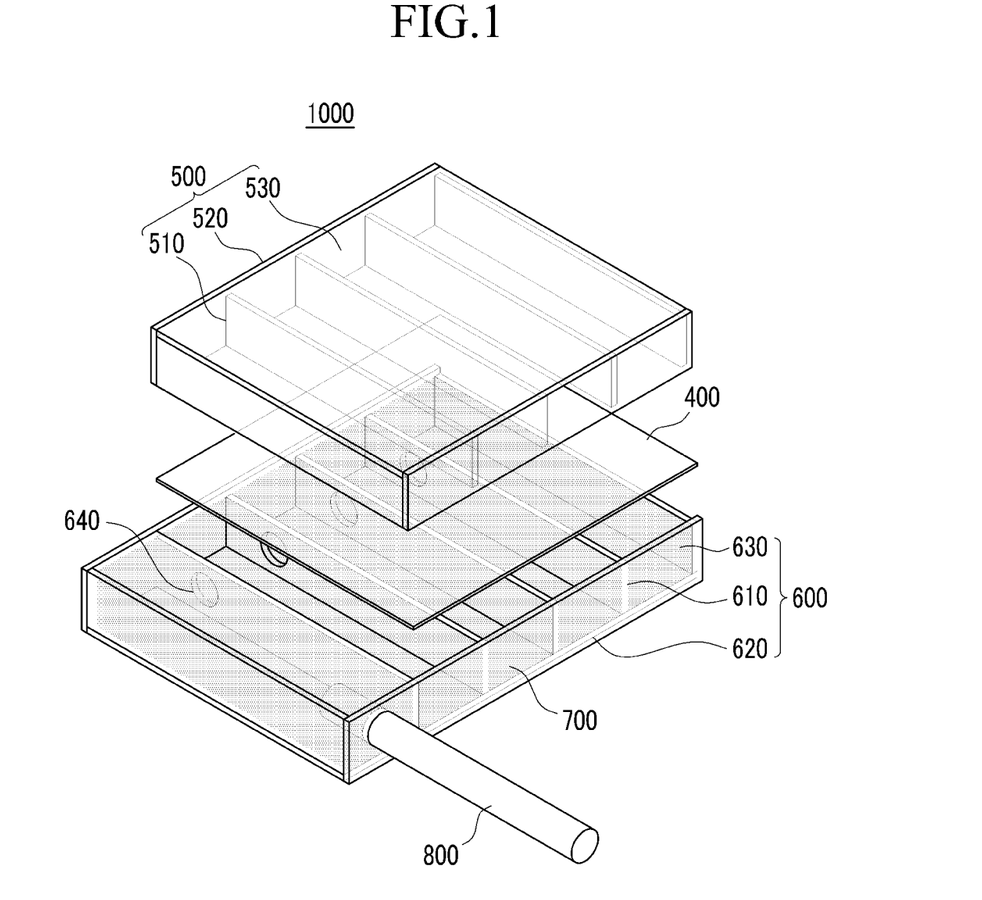
FIG. 1 is a perspective view of a lens array according to an exemplary embodiment of the present invention.

FIG. 1 is a perspective view of a lens array according to an exemplary is embodiment of the present invention.

As shown in FIG. 1, a lens array 1000 may include an upper lattice plate 500, a lower lattice plate 600, and a membrane 400.

The upper lattice plate 500 may be made of a transparent material, and may include an upper lattice unit 510, an upper rear portion 520, and an upper side portion 530. The lower lattice plate 600 may also be made of a transparent material, and may include a lower lattice unit 610, a lower rear portion 620, and a lower side portion 630.

The lower lattice plate 600 may be filled with a liquid 700, and the transparent liquid 700 may be moved through a passage 640 formed in the lower lattice unit 610. Also, a hydraulic pressure cylinder 800 to control the volume of the liquid may be positioned at one edge of the lower lattice plate 600.

The membrane 400 may be made of a transparent material such as, for example, polydimethylsiloxane (PDMS), and may have elasticity and adherence.

FIG. 2, FIG. 3, FIG. 4, and FIG. 5 are views showing two-dimensional and three-dimensional conversion of a lens array according to an exemplary embodiment of the present invention.

Figure 2:
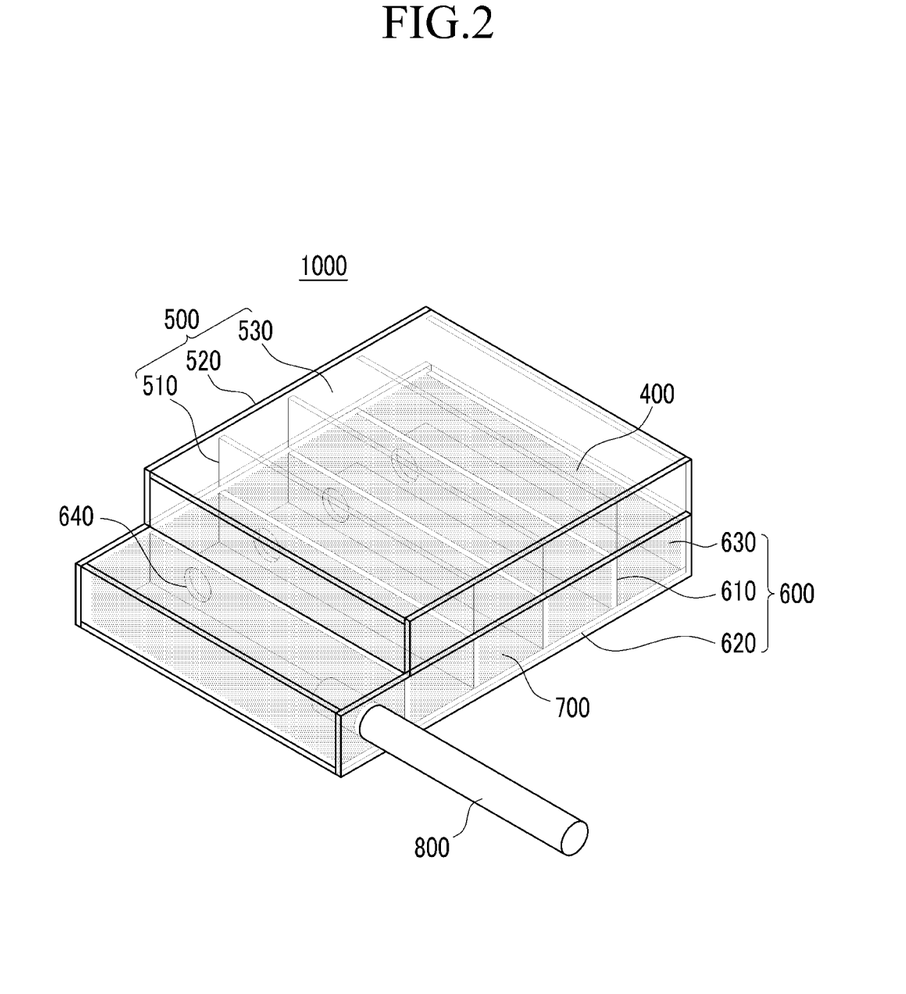
FIG. 2, FIG. 3, FIG. 4, and FIG. 5 are views showing two-dimensional and three-dimensional conversion of a lens array according to an exemplary embodiment of the present invention.
Figure 3:
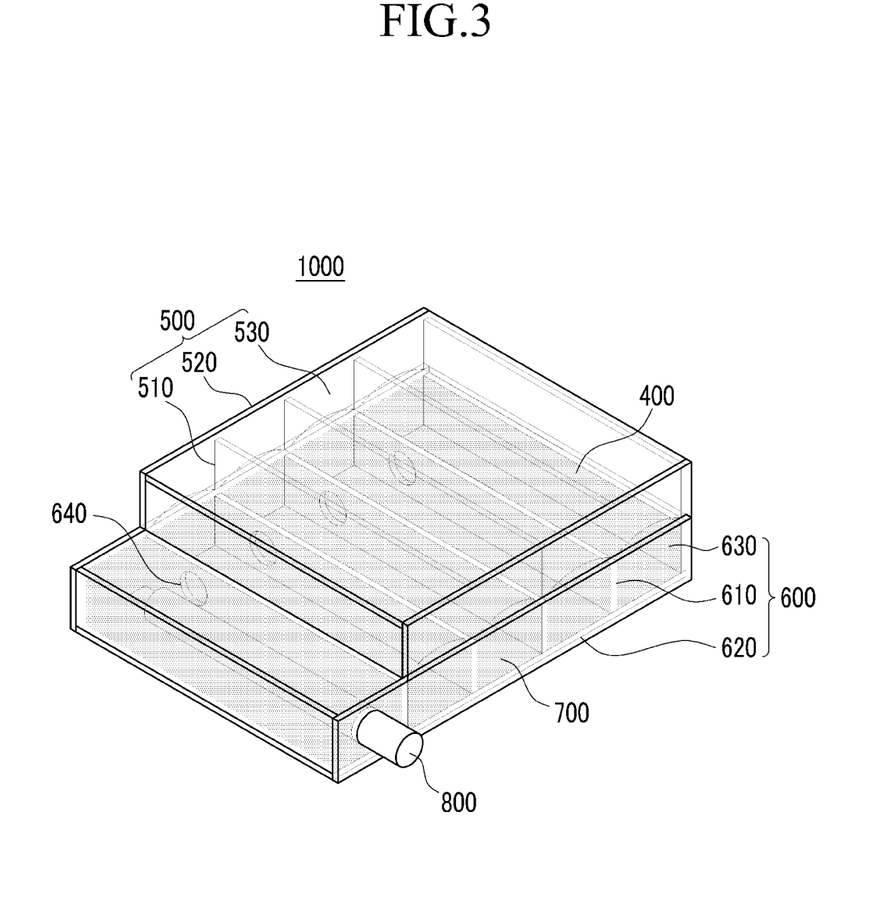

As shown in FIG. 2 and FIG. 3, the membrane 400 is positioned between the upper lattice plate 500 and lower lattice plate 600, and is attached to the upper lattice unit 510 and the lower lattice unit 610.

Also, the upper lattice unit 510 and the lower lattice unit 610 are engaged to each other thereby forming a long region of a crosswise direction.

If pressure is not applied to the liquid 700, the membrane 400 has a flat shape, and the liquid 700, the lower lattice plate 600, the membrane 400, and the upper lattice plate 500 are is transparent such that light is transmitted in the straight line.

Figure 4:
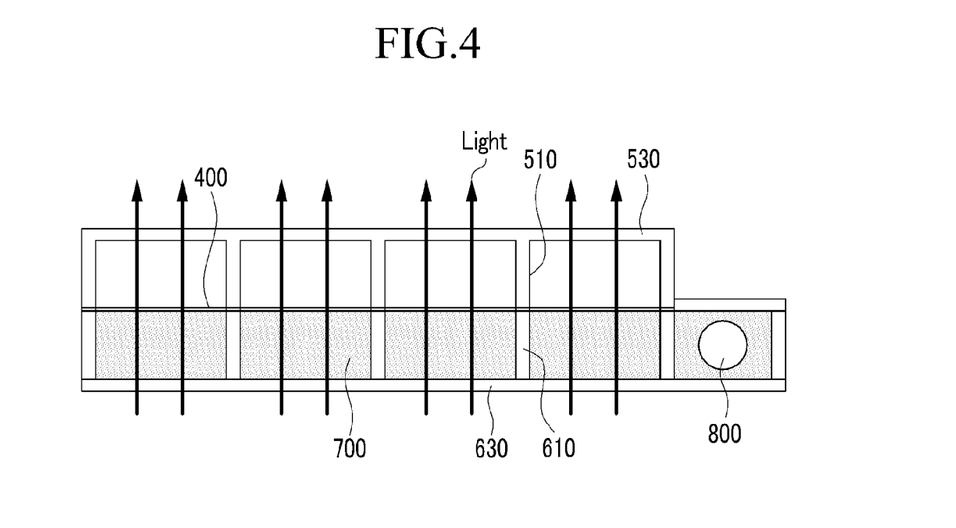
Figure 5:
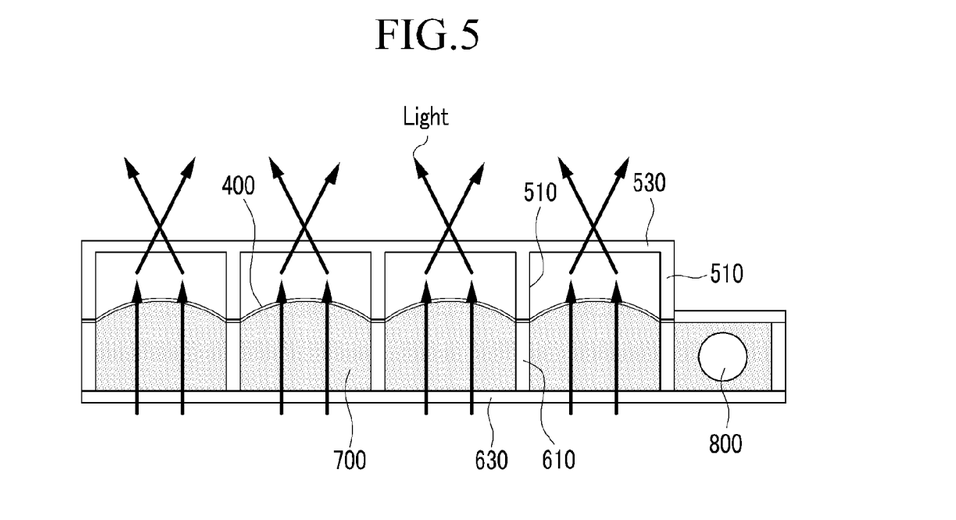

As shown in FIG. 4 and FIG. 5, the liquid 700 exists between the membrane 400 and the lower lattice plate 600 and an empty space is formed between the membrane 400 and the upper lattice plate 500, such that if pressure is applied to the liquid 700 by using the hydraulic pressure cylinder 800, the liquid 700 is moved through the passage 640 and the membrane 400 becomes convex within the long regions.

That is, the convex surface of the membrane 400 of the long regions between the locations where the upper lattice unit 510 and the lower lattice unit 610 are engaged to each other functions as a lens such that if light is transmitted through the lens array 1000, three-dimensional images may be seen.

As described above, the lens array according to an exemplary embodiment of the present invention controls the pressure by using the hydraulic pressure cylinder 800 such that the lens array may function as both a two-dimensional and a three-dimensional lens.

Figure 6:
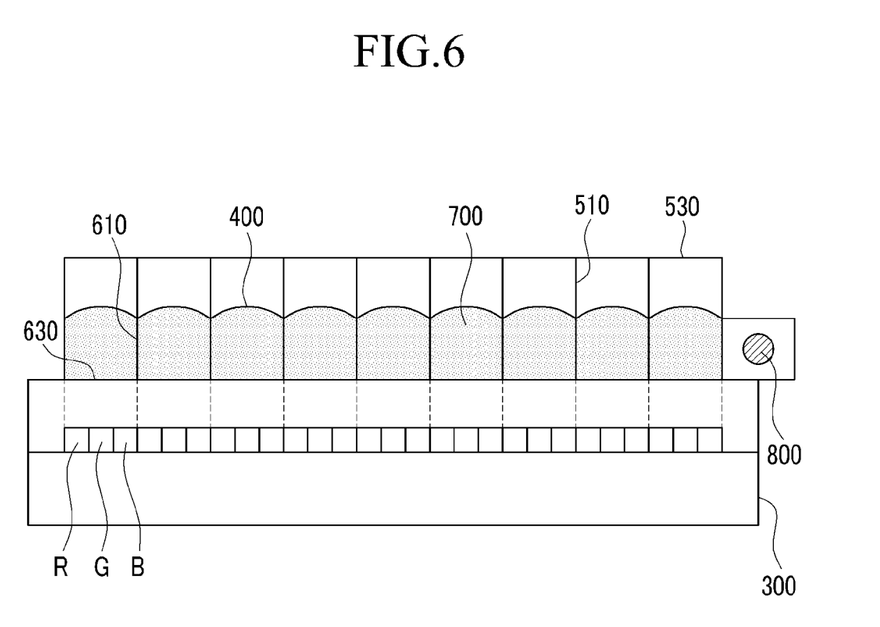
FIG. 6 is a cross-sectional view of a display device applied with a lens array according to an exemplary embodiment of the present invention.

FIG. 6 is a cross-sectional view of a display device including a lens array according to an exemplary embodiment of the present invention.

As shown in FIG. 6, the lens array is positioned on a display panel 300, each long region formed through engagement of an upper lattice unit 510 and a lower lattice unit 610 corresponds to pixel areas R, G, and B of the display panel 300.

Through this configuration, the images formed in the display panel 300 may be shown through the lens array. If pressure is applied to the liquid 700 by using the hydraulic pressure cylinder 800, the membrane 400 becomes convex in each long region formed by the engagement of the upper lattice unit 510 and the lower lattice unit 610. In this case, the images formed in the display panel 300 may be shown three-dimensionally.

Also, if the pressure applied to the liquid 700 is removed, the membrane 400 becomes flat in each region formed by the engagement of the upper lattice unit 510 and the lower lattice unit 610. In this case, the images formed in the display panel 300 may be shown two-dimensionally.

Figure 7:
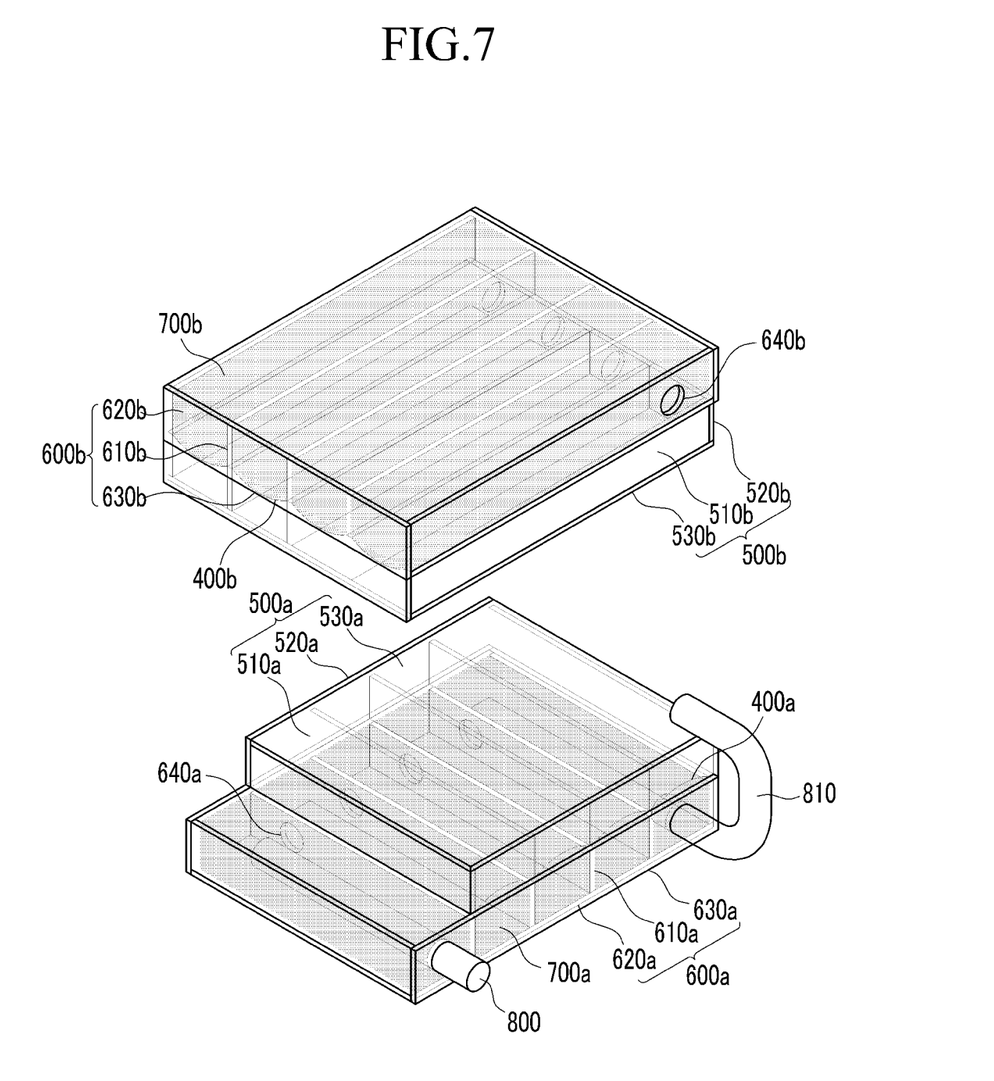
FIG. 7 is a view of a lens array according to an exemplary embodiment of the present invention.

FIG. 7 is a view of a lens array according to an exemplary embodiment of the present invention.

As shown in FIG. 7, a lens array according to the present exemplary embodiment has a shape in which lens arrays according to the exemplary embodiment of FIG. 1 are overlapped with each other. That is, the upper rear portion 530b of the upper lens array and the upper rear portion 530a of the lower lens array meet. Here, the upper lens array is positioned on the lower lens array such that the convex surfaces of the membranes 400a and 400b face each other.

Also, the lattice portions 510b and 610b of the upper lens array and the lattice portions 510a and 610a of the lower lens array are perpendicular to and intersect each other.

This configuration changes a one-dimensional matrix lens array into a two-dimensional matrix lens array, and an integral imaging three-dimensional system is possible.

The upper lens array and the lower lens array are connected to each other through the passage 810, and if the hydraulic pressure cylinder 800 of the lower lens array applies pressure to the liquid 700a, the pressure is transmitted to the liquid 700b of the upper lens array through the passage 810 such that the membrane 400b of the upper lens array becomes convex as well as the membrane 400a of the lower lens array.

Figure 8:
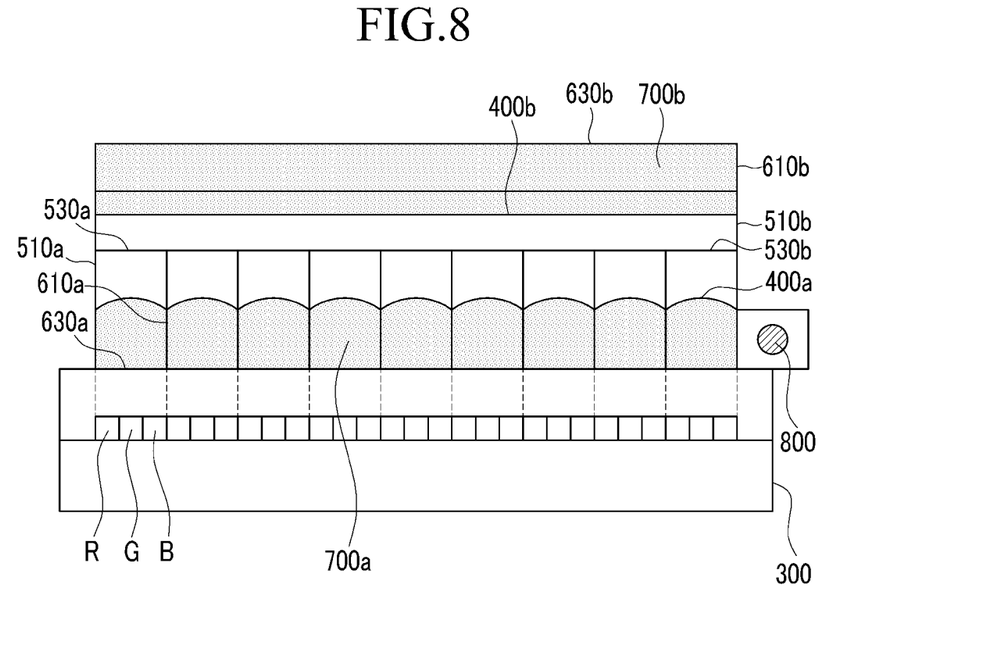
FIG. 8 is a cross-sectional view of a display device applied with a lens array according to the exemplary embodiment of FIG. 7.

FIG. 8 is a cross-sectional view of a display device applied with a lens array according to the exemplary embodiment of FIG. 7.

As shown in FIG. 8, the lens array is positioned on the display panel 300, and the region formed through the engagement of the upper lattice unit 510a and the lower lattice unit 610a respectively corresponds to pixel areas R, G, and B of the display panel 300.

Through this configuration the images formed in the display panel 300 may be shown through the lens array. If the pressure is applied to the liquid 700 by using the hydraulic pressure cylinder 800, the membrane 400a of the lower lens array becomes convex as well as the membrane 400b of the upper lens array. In this case, the images formed in the display panel 300 may be shown three-dimensionally.

Also, if the pressure applied to the liquid 700a is removed, the membrane 400b of the upper lens array becomes flat as well as the membrane 400a of the lower lens array. In this case, the images formed in the display panel 300 may be shown two-dimensionally.

Figure 9:
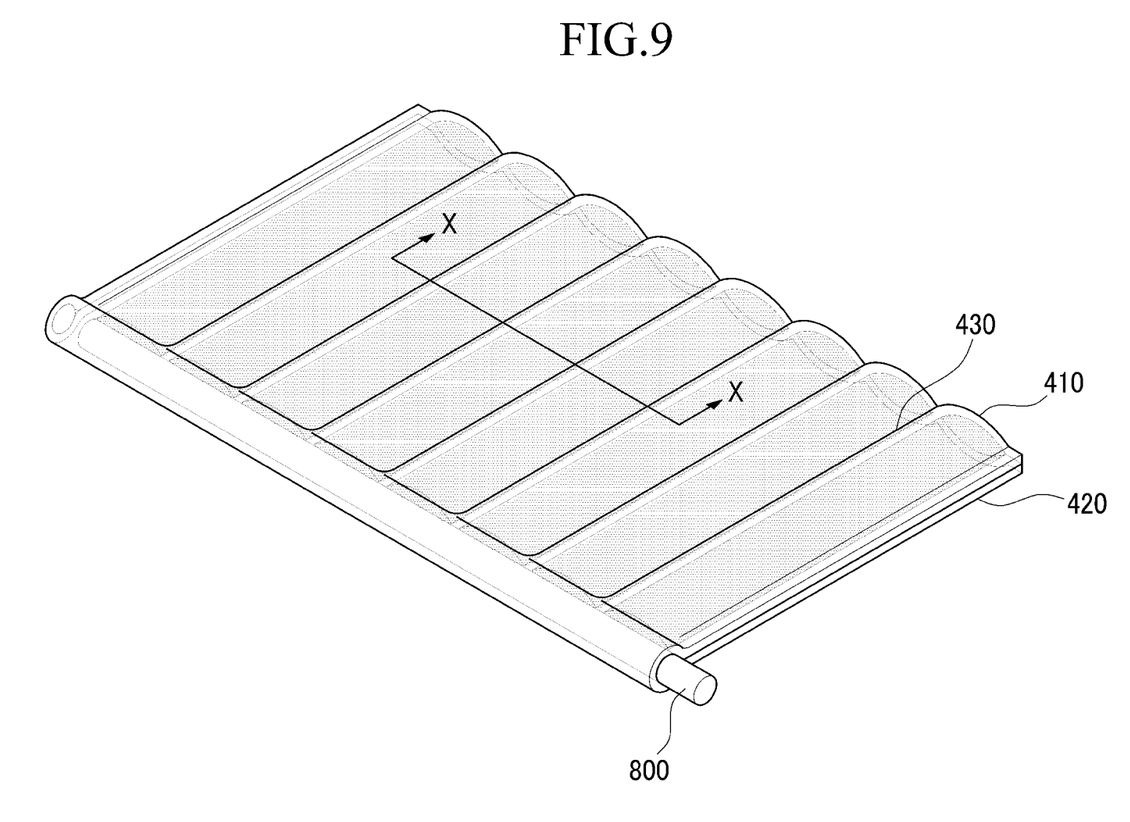
FIG. 9 is a view of a lens array according to an exemplary embodiment of the present invention.
Figure 10:
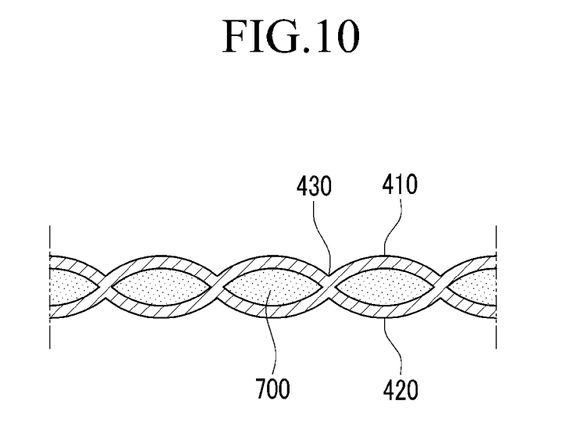
FIG. 10 is a cross-sectional view taken along the line X-X shown in FIG. 9.
Figure 11:
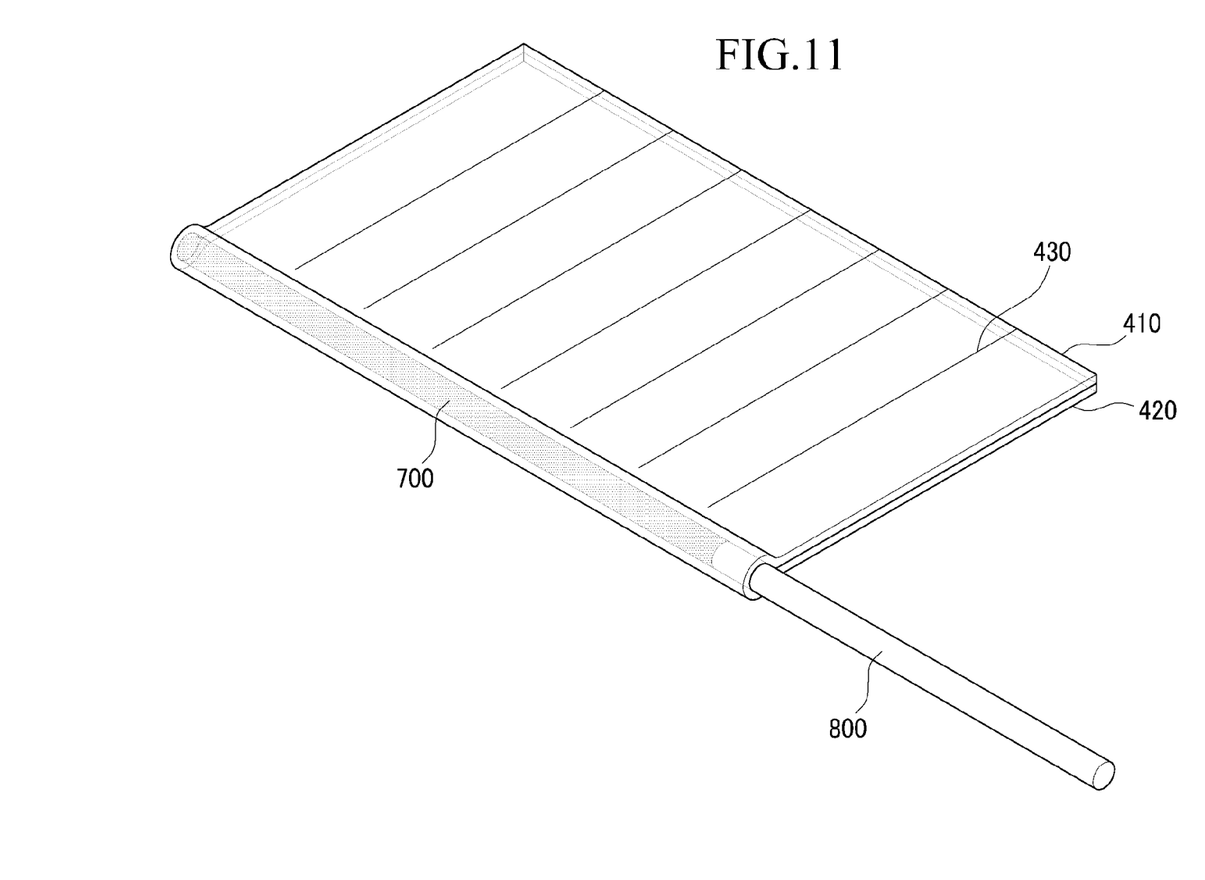
FIG. 11 is a view of a two-dimensional conversion of the lens array shown in FIG. 9.

FIG. 9 is a view of a lens array according to an exemplary embodiment of the present invention, FIG. 10 is a cross-sectional view taken along the line X-X shown in FIG. 9, and FIG. 11 is a view of a two-dimensional conversion of the lens array shown in FIG. 9.

As shown in FIG. 9, FIG. 10, and FIG. 11, a lens array according to an exemplary embodiment of FIG. 9 only includes a membrane without an upper lattice plate or a lower lattice plate. That is, the liquid 700 is filled between the upper membrane 410 and the lower membrane 420.

The upper membrane 410 and the lower membrane 420 are partially joined at the junction 430 so as to create a passage through which the liquid 700 may be moved. The upper membrane 410 and the lower membrane 420 may be made of a transparent material such as, for example, polydimethylsiloxane (PDMS), and may have elasticity and adherence.

In an exemplary embodiment of the present invention the upper membrane 410 and the lower membrane 420 may be made of a single membrane that is folded in order to create the upper membrane 410 and the lower membrane 420. Also, the upper membrane 410 and the lower membrane 420 may be only partially joined to each other, so as to leave a portion near the fold unjoined, as shown in FIG. 9.

If pressure is applied to the liquid 700 filled between the upper membrane 410 and the lower membrane 420 by using the hydraulic pressure cylinder 800 as shown in FIG. 9 and FIG. 10, the liquid 700 is moved, and portions of the upper membrane 410 and the lower membrane 420 between the junctions 430 become convex due to the pressure.

The convex surfaces of the upper membrane 410 and the lower membrane 420 function as a lens such that three-dimensional images may be shown if light is passed through the lens array.

Also, if the pressure applied to the liquid 700 is released, as shown in FIG. 11, the convex surfaces of the upper membrane 410 and the lower membrane 420 become flat such that a two-dimensional image may be shown.

As described above, the pressure is controlled by using the hydraulic pressure cylinder 800 thereby controlling whether the lens array functions as a two-dimensional or three-dimensional lens.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lens array, comprising:
a first upper lattice plate comprising first upper lattices;
a first lower lattice plate comprising first lower lattices;
a first membrane separating the first upper lattice plate and the first lower lattice plate;
a transparent liquid disposed within the first lower lattice plate; and
a hydraulic pressure controller disposed in the first lower lattice plate,
wherein the first upper lattices and the first lower lattices are engaged with each other thereby forming first regions.

2. The lens array of claim 1, wherein at least one of the first upper lattice plate, the first lower lattice plate, and the first membrane is transparent.

3. The lens array of claim 2, wherein at least one of the first lower lattices comprises a passage.

4. The lens array of claim 3, wherein:
the first regions are bisected by first upper lattices and the first membrane; and
the first membrane is configured to become convex in each of the first regions in response to application of pressure to the liquid by the hydraulic pressure controller.

5. The lens array of claim 1, further comprising:
a second upper lattice plate disposed on the first upper lattice plate, the second upper lattice plate comprising second upper lattices;
a second lower lattice plate disposed on the first upper lattice plate, the second lower lattice plate comprising second lower lattices; and
a second membrane separating the second upper lattice plate and the second lower lattice plate,
wherein the second upper lattices and the second lower lattices are engaged with each other thereby forming second regions that extend lengthwise, in perpendicular to the first regions.

6. The lens array of claim 5, wherein at least one of the second upper lattice plate, the second lower lattice plate, and the second membrane is transparent.

7. The lens array of claim 6, wherein:
the transparent liquid is further disposed within the second lower lattice plate, and
at least one of the second lower lattices comprises a passage.

8. The lens array of claim 7, further comprising a passage connecting the first lower lattice plate and the second lower lattice plate.

9. The lens array of claim 8, wherein:
the second upper lattices and the second lower lattices are engaged with each other and are fixed to the second membrane, and
the first membrane and the second membrane are configured to become convex in each of the first regions and each of the second regions in response to application of pressure to the liquid by the hydraulic pressure controller.

10. The lens array of claim 1, wherein the hydraulic pressure controller comprises a hydraulic pressure cylinder.

11. A lens array comprising:
a first membrane;
a second membrane partially joined with the first membrane, thereby forming first regions that each comprise an open end and an opposing closed end;
a pressure cylinder directly connected to each of the open ends, to selectively supply a transparent liquid to the first regions; and
a hydraulic pressure controller to control the pressure of the transparent liquid.

12. The lens array of claim 11, wherein at least one of the first membrane and the second membrane is transparent.

13. The lens array of claim 12, wherein:
the first membrane and the second membrane are configured to become convex in each of the first regions, in response to application of pressure to the liquid by the hydraulic pressure controller.

14. A display device comprising:
a display panel comprising pixels to display images; and
a lens array disposed on the display panel and comprising:
a first upper lattice plate comprising first upper lattices;
a first lower lattice plate comprising first lower lattices;
a first membrane separating the first upper lattice plate and the first lower lattice plate;

a transparent liquid disposed within the first lower lattice plate; and a hydraulic pressure controller disposed in the first lower lattice plate, wherein the first upper lattices and the first lower lattices are engaged with each other, thereby forming first regions.

15. The display device of claim 14, wherein the first regions are located so as to correspond to locations of the pixels.

16. The display device of claim 15, wherein at least one of the first upper lattice plate, the first lower lattice plate, and the first membrane is transparent.

17. The display device of claim 16, wherein at least one of the first lower lattices comprises a passage.

18. The display device of claim 17, wherein:
the regions are bisected by the first membrane; and
the first membrane is configured to become convex in each of the first regions in response to application of pressure to the liquid by the hydraulic pressure controller.

19. The display device of claim 14, further comprising:
a second upper lattice plate disposed on the first upper lattice plate, the second upper lattice plate comprising second upper lattices;
a second lower lattice plate disposed on the first upper lattice plate, the second lower lattice plate comprising second lower lattices; and
a second membrane disposed between the second upper lattice plate and the second lower lattice plate,
wherein the second upper lattices and the second lower lattices are engaged with each other thereby forming second regions that extend lengthwise, in perpendicular to the first regions.

20. The display device of claim 19, wherein at least one of the second upper lattice plate, the second lower lattice plate, and the second membrane is transparent.

21. The display device of claim 20, wherein:
the transparent liquid is further disposed within the second lower lattice plate, and
at least one of the second lower lattices comprises a passage.

22. The display device of claim 21, further comprising a passage connecting the first lower lattice plate and the second lower lattice plate.

23. The display device of claim 22, wherein:
the second upper lattices and the second lower lattices are engaged with each other and are fixed to the second membrane, and
the first membrane and the second membrane are configured to become convex in each of the first regions and each of the second regions in response to application of pressure to the liquid by the hydraulic pressure controller.

24. A display device comprising:
a display panel comprising pixels to display images; and
a lens array disposed on the display panel and comprising:
a first membrane;
a second membrane jointed with the first membrane, thereby forming first regions that each comprise an open end and an opposing closed end;
a pressure cylinder directly connected to each of the open ends to selectively supply a transparent liquid to the first regions; and
a hydraulic pressure controller to control the pressure of the transparent liquid.

25. The display device of claim 24, wherein at least one of the first membrane and the second membrane is transparent.

26. The display device of claim 25, wherein
the first membrane and the second membrane are configured to become convex in each of the first regions, in response to application of pressure to the liquid by the hydraulic pressure controller.

27. The display device of claim 26, wherein the first regions are located so as to correspond to locations of the pixels.

* * * * *